US012197142B2

(12) United States Patent
Igo et al.

(10) Patent No.: US 12,197,142 B2
(45) Date of Patent: Jan. 14, 2025

(54) IMAGE FORMING APPARATUS, COLOR MISREGISTRATION CORRECTION METHOD, AND COMPUTER READABLE RECORDING MEDIUM STORING CONTROL PROGRAM

(71) Applicant: Konica Minolta, Inc., Tokyo (JP)

(72) Inventors: Shota Igo, Hachioji (JP); Takashi Nara, Kawagoe (JP); Naoto Sugaya, Hachioji (JP); Kenji Tamaki, Tokorozawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/306,338

(22) Filed: Apr. 25, 2023

(65) Prior Publication Data

US 2023/0375954 A1 Nov. 23, 2023

(30) Foreign Application Priority Data

May 23, 2022 (JP) ................................ 2022-083563

(51) Int. Cl.
*G03G 15/01* (2006.01)
*G03G 15/08* (2006.01)

(52) U.S. Cl.
CPC ..... *G03G 15/0105* (2013.01); *G03G 15/0189* (2013.01); *G03G 15/0863* (2013.01); *G03G 2215/00704* (2013.01); *G03G 2215/047* (2013.01)

(58) Field of Classification Search
CPC .......... G03G 15/0105; G03G 15/0189; G03G 15/0863; G03G 2215/00704; G03G 2215/047; G03G 2215/0158; G03G 15/5058
See application file for complete search history.

(56) References Cited

U.S. PATENT DOCUMENTS

2010/0129104 A1* 5/2010 Ogata ................ G03G 15/0136 399/302
2010/0303512 A1* 12/2010 Kamekura ......... G03G 15/5058 399/301
2017/0185022 A1* 6/2017 Tsuda ................. G03G 15/5058
2018/0352113 A1* 12/2018 Amada .............. G03G 15/0189

FOREIGN PATENT DOCUMENTS

JP 2006201457 8/2006
JP 2016133544 7/2016

* cited by examiner

*Primary Examiner* — Sandra Brase
(74) *Attorney, Agent, or Firm* — BakerHostetler

(57) ABSTRACT

The image forming apparatus includes a crimping/release mechanism that switches between a crimping position where a transfer nip is formed and a release position where the intermediate transfer belt and the photosensitive drum are separated from each other, by moving at least one primary transfer section of a plurality of primary transfer sections provided facing a plurality of photosensitive drums respectively, and a processor that performs color misregistration adjustment when a combination of image forming units used for image formation is changed.

14 Claims, 9 Drawing Sheets

SECOND-1 GROUP (Y/M/C/K/S)

FIRST GROUP (Y/M/C/K)

SECOND-2 GROUP (K/S)

FIG. 4

| PRINT MODE | | FIVE-COLOR MODE | FOUR-COLOR MODE | SPECIAL COLOR MODE |
|---|---|---|---|---|
| COMBINATION OF IMAGE FORMING UNITS TO BE USED (CRIMPED PRIMARY TRANSFER SECTION) | | SECOND-1 GROUP (Y/M/C/K/S) | FIRST GROUP (Y/M/C/K) | SECOND-2 GROUP (K/S) |
| Y COLOR CORRECTION AMOUNT | MAIN SCANNING POSITION (*) | ** | ** | – |
| | SUB-SCANNING POSITION (*) | ** | ** | – |
| | MAIN SCANNING MAGNIFICATION | ** | ** | – |
| | SUB-SCANNING MAGNIFICATION | ** | ** | – |
| | INCLINATION | ** | ** | – |
| | CURVATURE | ** | ** | – |
| M COLOR CORRECTION AMOUNT | ...... | ...... | ...... | ...... |
| C COLOR CORRECTION AMOUNT | ...... | ...... | ...... | ...... |
| K COLOR CORRECTION AMOUNT | ...... | ...... | ...... | ...... |
| S COLOR CORRECTION AMOUNT | MAIN SCANNING POSITION (*) | ** | ** | ** |
| | SUB-SCANNING POSITION (*) | ** | ** | ** |
| | ...... | ...... | ...... | ...... |

NOTE 1: AT *, CORRECTION AMOUNT IS DEFINED BY CORRECTION AMOUNT WITH RESPECT TO REFERENCE COLOR (K).

NOTE 2: ** INDICATES ARBITRARY VALUE. SINCE SPECIAL COLOR MODE DOES NOT USE Y COLOR AND THE LIKE, CORRECTION AMOUNT FIELDS ARE EMPTY.

FIG. 9

| PRINT MODE | | FIVE-COLOR MODE | FOUR-COLOR MODE | SPECIAL COLOR MODE |
|---|---|---|---|---|
| COMBINATION OF IMAGE FORMING UNITS TO BE USED (CRIMPED PRIMARY TRANSFER SECTION) | | SECOND-1 GROUP (Y/M/C/K/S) | FIRST GROUP (Y/M/C/K) | SECOND-2 GROUP (K/S) |
| APPARATUS STATE INFORMATION (AT TIME OF ADJUSTMENT) | TOTAL NUMBER OF PRINTS | ** | ** | ...... |
| | ENVIRONMENTAL TEMPERATURE | ** | ** | ...... |
| Y COLOR CORRECTION AMOUNT | MAIN SCANNING POSITION | ** | ** | – |
| | SUB-SCANNING POSITION | ** | ** | – |
| | MAIN SCANNING MAGNIFICATION | ** | ** | – |
| | SUB-SCANNING MAGNIFICATION | ** | ** | – |
| | INCLINATION | ** | ** | – |
| | CURVATURE | ** | ** | – |
| M COLOR CORRECTION AMOUNT | ...... | ...... | ...... | ...... |
| C COLOR CORRECTION AMOUNT | ...... | ...... | ...... | ...... |
| K COLOR CORRECTION AMOUNT | ...... | ...... | ...... | ...... |
| S COLOR CORRECTION AMOUNT | MAIN SCANNING POSITION | ** | ** | ** |
| | SUB-SCANNING POSITION | ** | ** | ** |
| | ...... | ...... | ...... | ...... |

IMAGE FORMING APPARATUS, COLOR MISREGISTRATION CORRECTION METHOD, AND COMPUTER READABLE RECORDING MEDIUM STORING CONTROL PROGRAM

CROSS-REFERENCE TO RELATED APPLICATION

This application claims priority to Japanese patent application No. 2022-083563 filed on May 23, 2022, the entire disclosure of which is incorporated herein by reference.

BACKGROUND

Technological Field

The present invention relates to an image forming apparatus, a color misregistration correction method, and a computer readable recording medium storing a control program.

Description of the Related Art

An electrophotographic full-color image forming apparatus forms a color image by superimposing images of respective colors on an intermediate such as an intermediate transfer belt. If the image forming positions of the respective colors do not coincide with each other with high accuracy, color misregistration occurs. As a technology for adjusting color misregistration, there is a technology in which the registration patterns of respective colors are formed on an intermediate transfer member, the positions of these registration patterns are detected by an optical sensor, and the image forming positions of the respective colors are calculated to perform color misregistration correction. For example, in an image forming apparatus disclosed in JP 2016-133544 A, a problem arises in that the positions of toner images of the respective colors on an intermediate transfer belt shift when the pressing force of a secondary transfer section is changed according to the type of sheet, and in order to solve this problem, registration patterns are formed on the intermediate transfer belt under conditions of a plurality of different pressing forces of the secondary transfer section and are detected by a detection section, thereby generating color misregistration correction data corresponding to the plurality of pressing forces.

In general, an image forming apparatus is capable of executing a plurality of types of print modes having different numbers of colors of toners to be used or different combinations of colors. In each print mode, driving is stopped in an image forming unit (constituted by a photosensitive drum, a developing device, and the like) which is not used in order to suppress deterioration of the apparatus due to abrasion or the like. At this time, in order to prevent defects such as scratches due to unnecessary rubbing between the unused and stopped photosensitive drum and the intermediate transfer belt that moves and rotates, the intermediate transfer belt is separated from the photosensitive drum by retracting the primary transfer roller from the crimping position to the release position. In JP 2006-201457 A, different print modes such as a single-color mode and a multi-color mode can be executed, and when calibration for correcting a color misregistration amount or density is executed, the timing of executing calibration is made different depending on a difference in the print mode.

SUMMARY

The intermediate transfer belt is stretched by a plurality of rollers such as a driving roller, a tension roller, and a primary transfer roller arranged on the inner peripheral surface. The stretched state of the intermediate transfer belt is changed by switching the crimping/release state of the primary transfer roller in internal contact with the intermediate transfer belt in accordance with the type of print mode, and thus the color misregistration amount is changed.

In the technology of JP 2006-201457 A, although the execution timing of calibration is changed depending on the difference in the print mode, since the calibration for each different print mode is not considered, the technology cannot cope with a plurality of types of print modes having different numbers of colors or combinations of colors. With the technology of JP 2016-133544 A, by generating color misregistration correction data corresponding to a change in the pressing force of the secondary transfer section, it is possible to perform appropriate color misregistration adjustment corresponding to the change in the pressing force, but it is similarly not possible to support a plurality of types of print modes having different numbers of colors or different combinations of colors.

The present invention has been made in view of the above circumstances, and an object of the present invention is to provide an image forming apparatus, a color misregistration correction method, and a control program which can perform appropriate color misregistration adjustment even in a case where a plurality of types of print modes having different numbers of colors or different combinations of colors are executed.

To achieve at least one of the abovementioned objects, according to an aspect of the present invention, a device system reflecting one aspect of the present inventions comprises the followings.

There is provided an image forming apparatus including a plurality of image forming units that include image carriers and form toner images of different colors on the image carriers by using developing devices, an intermediate transfer belt to which the toner image on the image carrier is transferred, a plurality of primary transfer sections that are each provided facing a corresponding one of the plurality of image carriers and form a transfer nip by being urged toward the image carrier from an inner peripheral surface side of the intermediate transfer belt, a crimping/release mechanism that switches between a crimping position where the transfer nip is formed and a release position where the intermediate transfer belt and the image carrier are separated from each other by moving at least one of the primary transfer sections according to a combination of the image forming units used for image formation, and a hardware processor that performs color misregistration adjustment when the combination of the image forming units used for image formation is changed.

To achieve at least one of the abovementioned objects, according to an aspect of the present invention, a method reflecting one aspect of the present inventions comprises the followings.

There is provided a color misregistration correction method executed in an image forming apparatus including a plurality of image forming units that include image carriers and form toner images of different colors on the image carriers by using developing devices, an intermediate transfer belt to which the toner image on the image carrier is transferred, a plurality of primary transfer sections that are each provided facing a corresponding one of the plurality of image carriers and form a transfer nip by being urged toward the image carrier from an inner peripheral surface side of the intermediate transfer belt, and a crimping/release mechanism that switches between a crimping position where the transfer nip is formed and a release position where the intermediate transfer belt and the image carrier are separated from each other by moving at least one of the primary transfer sections according to a combination of the image forming units used for image formation, the color misregistration correction method including performing color misregistration adjustment when the combination of the image forming units used for image formation is changed.

To achieve at least one of the abovementioned objects, according to an aspect of the present invention, a computer readable recording medium storing a control program reflecting one aspect of the present inventions comprises the followings.

There is provided a computer readable recording medium storing a control program for controlling an image forming apparatus including a plurality of image forming units that include image carriers and form toner images of different colors on the image carriers by using developing devices, an intermediate transfer belt to which the toner image on the image carrier is transferred, a plurality of primary transfer sections that are each provided facing a corresponding one of the plurality of image carriers and form a transfer nip by being urged toward the image carrier from an inner peripheral surface side of the intermediate transfer belt, and a crimping/release mechanism that switches between a crimping position where the transfer nip is formed and a release position where the intermediate transfer belt and the image carrier are separated from each other by moving at least one of the primary transfer sections according to a combination of the image forming units used for image formation, the control program causing a computer to perform color misregistration adjustment when the combination of the image forming units used for image formation is changed.

The objects, features, and characteristics of this invention other than those set forth above will become apparent from the description given herein below with reference to preferred embodiments illustrated in the accompanying drawings.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 4 is a diagram illustrating an example of color misregistration correction amounts;

FIG. 9 is a diagram illustrating an example of color misregistration correction amounts associated with an apparatus state, which is used in the second embodiment.

DETAILED DESCRIPTION OF EMBODIMENTS

Figure 1:
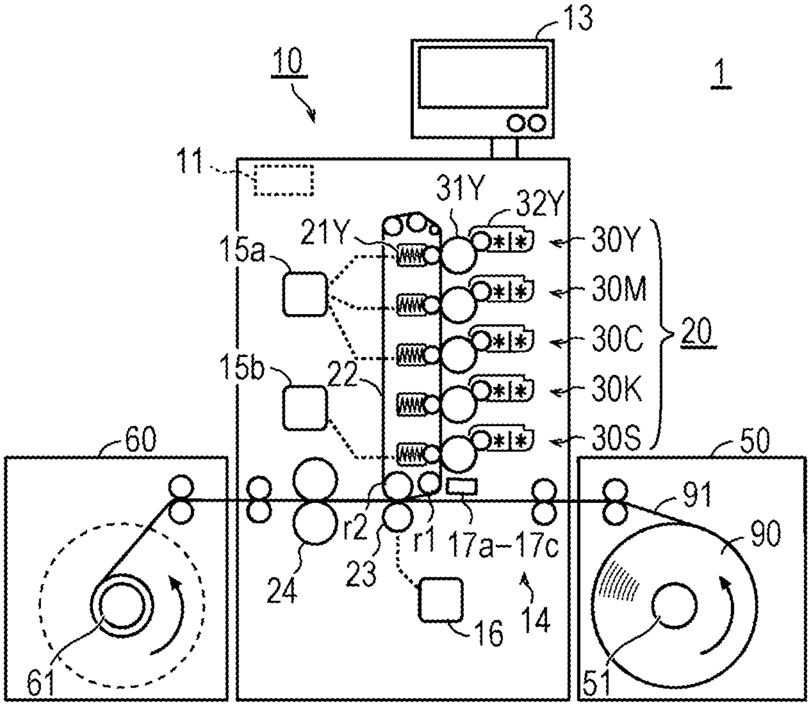
FIG. 1 is a diagram illustrating a schematic configuration of an image forming apparatus according to the embodiment.

Embodiments of the present invention will be described hereinafter with reference to the accompanying drawings. However, the scope of the invention is not limited to the disclosed embodiments. In the description of the drawings, the same components are denoted by the same reference numerals, and redundant description will be omitted. In addition, dimensional ratios in the drawings are exaggerated for convenience of explanation and may be different from actual ratios. Examples of the recording material include long or rolled continuous paper and cut (sheets) paper. Further, the continuous paper includes long label paper having a label coated with an adhesive bonded to long release paper.

Figure 2:
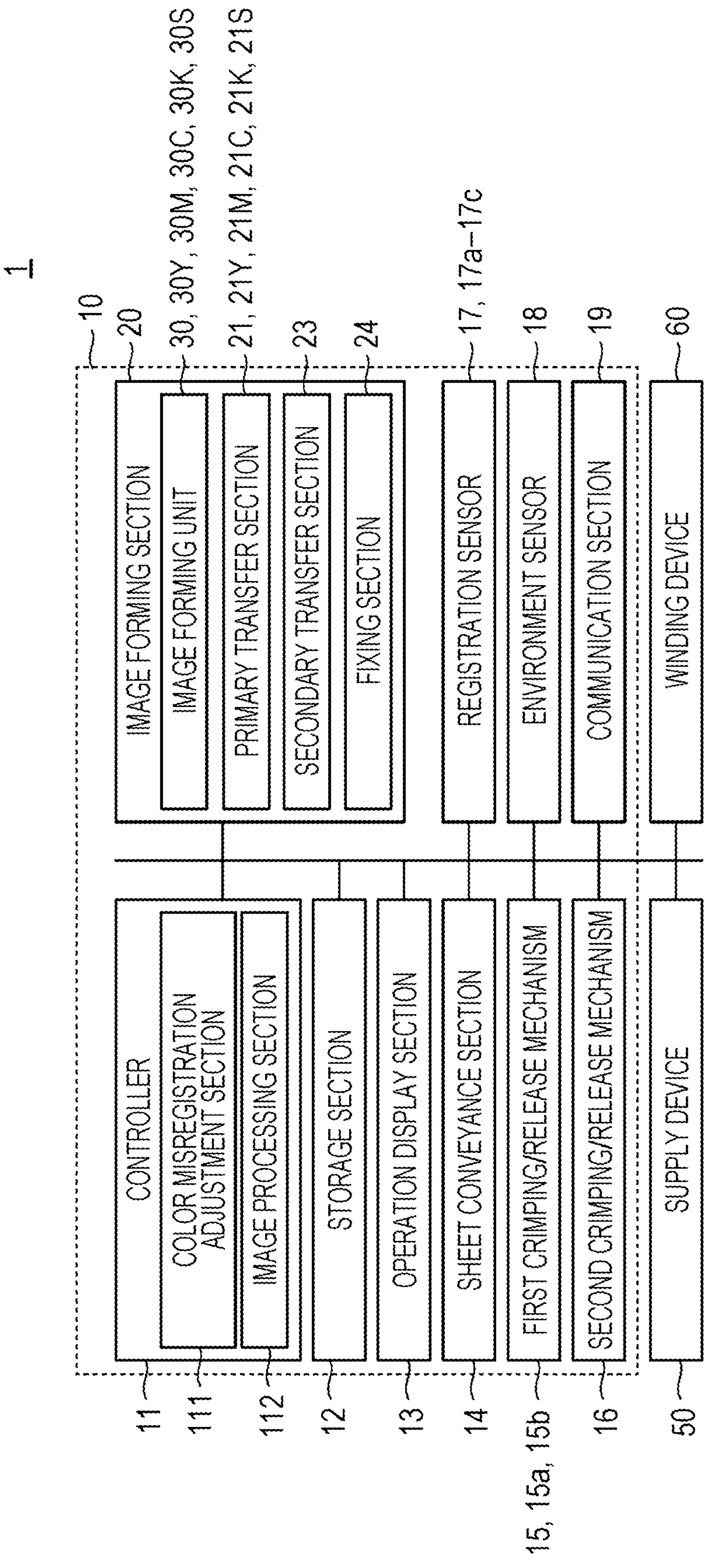
FIG. 2 is a block diagram illustrating the image forming apparatus.
Figure 3A:
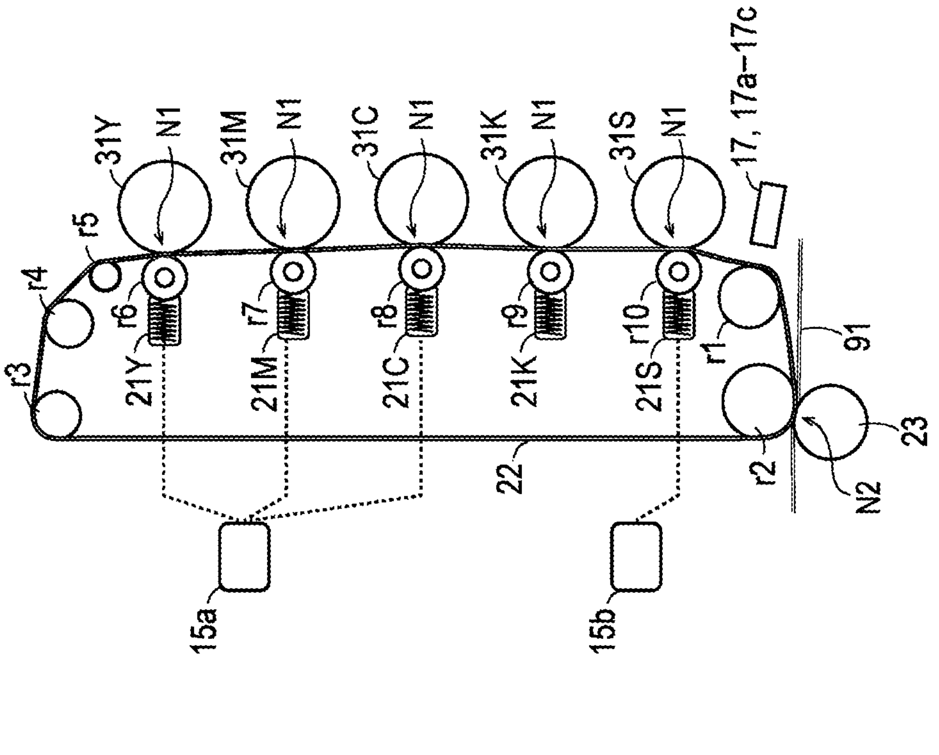
FIGS. 3A, 3B, and 3C are schematic diagrams illustrating the crimping/release states of the primary transfer section in various print modes (first, second-1, and second-2 groups)
Figure 3B:
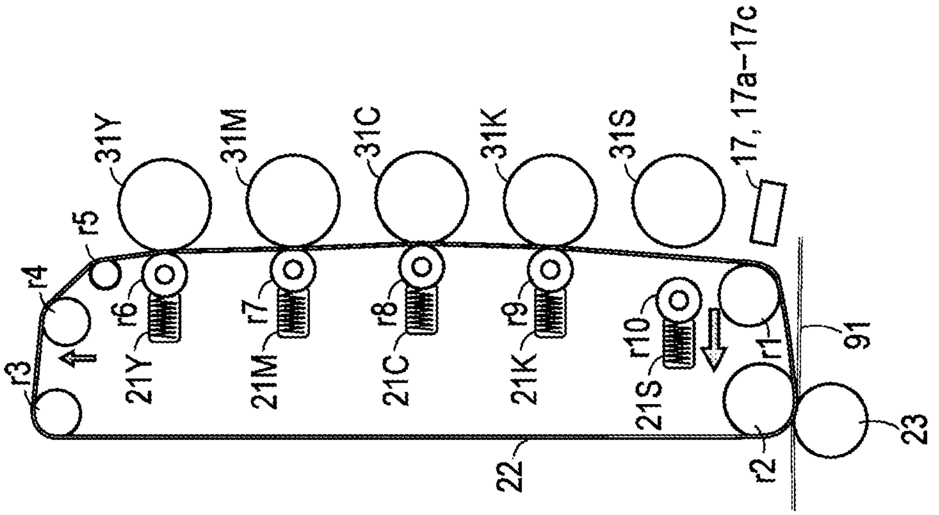
Figure 3C:
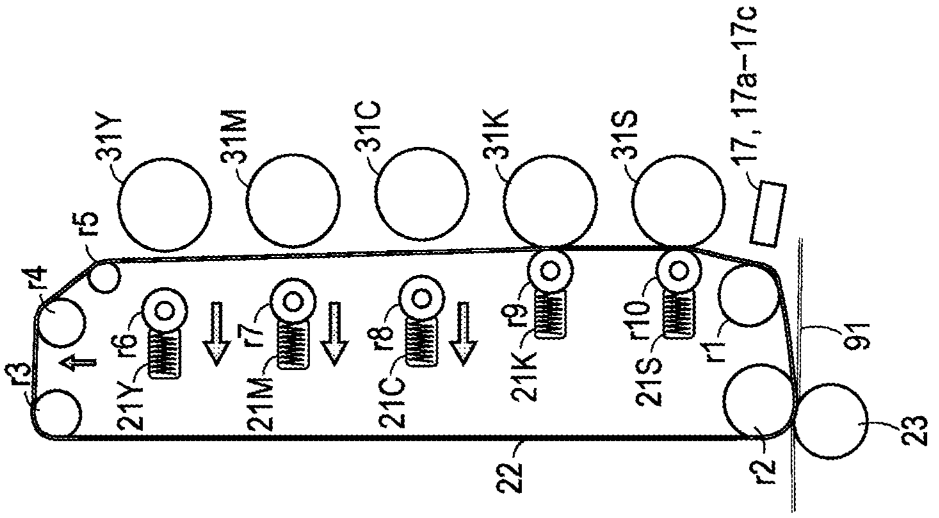

FIG. 1 is a diagram illustrating a schematic configuration of an image forming apparatus 1 according to the embodiment. FIG. 2 is a block diagram illustrating the hardware configuration of the image forming apparatus 1. FIGS. 3A to 3C are schematic diagrams illustrating the crimping/release states of the primary transfer section 21 in various print modes (first, second-1, and second-2 groups). As shown in FIGS. 1 and 2, the image forming apparatus 1 includes an image forming apparatus body 10, a supply device 50, and a winding device 60 which are mechanically and electrically connected to each other.

(Supply Device 50 and Winding Device 60)

The supply device 50 includes a folder 51 to which an original roll 90 of continuous paper 91 (also referred to as a roll sheet or roll paper) is removably attached. The winding device 60 includes a folder 61 for winding the continuous paper 91 fed from the original roll 90. In addition, each of the supply device 50 and the winding device 60 includes a controller, a storage section, a sheet conveyance section, and a communication section (some configurations are not illustrated). These constituent elements have the same or equivalent functions as those of constituent elements having corresponding terms in the image forming apparatus body 10 described later. The supply device 50 feeds the continuous paper 91 of the original roll 90 attached to the folder 51 to the downstream side of the conveyance path. The image forming apparatus body 10 performs image formation on the fed continuous paper 91. The continuous paper 91 on which an image is formed in the image forming apparatus body 10 is conveyed to the winding device 60 on the downstream side and is wound and held on the folder 61.

The image forming apparatus body 10 includes a controller 11 (a hardware processor), a storage section 12, an operation display section 13, a sheet conveyance section 14, a first crimping/release mechanism 15, a second crimping/release mechanism 16, an image forming section 20, a registration sensor 17, an environment sensor 18, and a communication section 19, which are connected to each other via signal lines. The image forming apparatus body 10 executes a plurality of types of print modes having different numbers of colors or different combinations of colors. As shown in FIGS. 3A to 3C, the print mode includes a four-color mode using basic colors (yellow (Y), magenta (M), cyan (C), and black (K)) (hereinafter also referred to as a first group), a five-color mode having a special color (S) added to the four-color mode (hereinafter also referred to as a second group (second-1 group)), and a special color mode of two colors of K and S (hereinafter also referred to as a second group (second-2 group)). The four-color mode corresponds to a standard full-color mode. Examples of the special color (S) toner include a white toner and a colorless transparent toner (clear toner) that enhances the visibility of paper.

(Controller 11)

The controller 11 is a CPU and controls respective sections of the apparatus and performs various kinds of arithmetic processing in accordance with programs. The controller 11 functions as a color misregistration adjustment section 111 and an image processing section 112.

As the print mode is changed, the first crimping/release mechanism 15 switches one of the primary transfer sections 21 of the image forming section 20 from the crimping position to the release position, or conversely from the release position to the crimping position, thereby changing the stretched state of an intermediate transfer belt 22. When the stretched state of the intermediate transfer belt 22 is changed due to a change in the print mode, the color misregistration adjustment section 111 performs color misregistration adjustment (also referred to as a registration pattern and registration adjustment, respectively) using a pattern for color misregistration correction. The color misregistration adjustment section 111 determines color misregistration correction amounts for the respective colors by color misregistration adjustment. FIG. 4 is an example of a color misregistration correction amount set by the color misregistration adjustment section 111. The color misregistration correction amount is set for each print mode, more specifically, for each number of colors or each combination of colors used in the print mode. Some color misregistration correction amount is set by a color misregistration amount from a reference color that is a predetermined color among colors used in each print mode. In the example of FIG. 4, the color misregistration correction amounts at the main scanning position and the sub-scanning position are set using K as a reference color (the same applies to the example of FIG. 9). Referring to FIG. 4, the color misregistration correction amount stored in the storage section 12 is an example of a print mode using a combination of three types of colors of the first, second-1, and second-2 group, but is not limited thereto. In a case where a print mode using another combination of colors is executable, a color misregistration correction amount for this other combination may be set and stored.

The image processing section 112 performs rasterization processing on print data (image data) included in a print job. The image processing section 112 performs image processing for gamma correction, screen correction, and density balance on the raster-format image data subjected to the rasterization processing. In addition, the image processing section 112 executes image processing related to two dimensional position correction such as main/sub-scanning positions, main/sub-scanning magnifications, inclination correction, and curvature correction using the color misregistration correction amount.

(Storage Section 12)

The storage section 12 includes a ROM that stores various programs and various types of data in advance, a RAM that temporarily stores programs and various types of information as a work area, and a hard disk that stores various programs and various types of data. In addition, the storage section 12 stores color misregistration correction amounts (FIG. 4 and the like described later). The storage section 12 also stores the total number of prints executed by the image forming apparatus 1 at the time of installation of the image forming apparatus 1 as a starting point. The total number of prints is counted up each time the controller 11 performs printing.

(Operation Display Section 13)

The operation display section 13 includes a touch panel, a numeric keypad, a start button, a stop button, and the like and is used for inputting various settings and instructions.

(Sheet Conveyance Section 14)

The sheet conveyance section 14 includes a conveyance path in which a plurality of conveyance rollers are disposed and conveys the continuous paper 91 in cooperation with the sheet conveyance sections of the supply device 50 and the winding device 60.

(Image Forming Section 20)

The image forming section 20 forms an image by, for example, an electrophotographic method. The image forming section 20 includes writing sections (not shown) respectively corresponding to basic colors (Y, M, C, and K) and a special color (S), image forming units 30Y, 30M, 30C, 30K, and 30S (hereinafter, also collectively referred to as image forming units 30, and the same applies to the following primary transfer sections 21), and primary transfer sections 21Y, 21M, 21C, 21K, and 21S (see, for example, FIG. 3A). The image forming section 20 also includes an intermediate transfer belt 22, a secondary transfer section 23, and a fixing section 24.

The image forming unit 30Y includes a photosensitive drum 31Y, a developing device 32Y, a charging device (not illustrated), a cleaning section (not illustrated), and the like. The photosensitive drum 31Y functions as an image carrier on which a toner image is formed by the developing device. The other image forming units 30M, 30C, 30K, and 30S have the same configuration as the image forming unit 30Y except for the color of toner inside the developing device 32. Referring to FIG. 1, the reference numerals of the photosensitive drums 31 and the developing devices 32 for colors other than Y are omitted.

As illustrated in FIG. 3A, each of the primary transfer sections 21 includes an urging member such as a spring and transfer rollers r6 to r10. The intermediate transfer belt 22 is an endless belt and is, for example, an 80-μm thick semiconductor belt made of polyimide and having a volume resistivity set to 8 to 11 LOG Ω·cm. The intermediate transfer belt 22 is stretched by a plurality of rollers r1 to r5 disposed therein and any one of the transfer rollers r6 to r10 (see FIG. 3A) of the primary transfer section 21. The roller r1 and/or the roller r2 is a driving roller, and a driving force of a drive source is transmitted thereto. The roller r4 is a tension roller and is movable in an inward/outward direction (radial direction) within a predetermined range while applying an outward urging force to the intermediate transfer belt 22. The plurality of primary transfer sections 21 are disposed inside the intermediate transfer belt 22 so as to face the photosensitive drums 31 (image carriers), respectively. As illustrated in FIG. 3A, all of the primary transfer sections 21 are located at the crimping positions in the five-color mode. At the crimping position, the primary transfer section 21 is urged from the inner peripheral surface side of the intermediate transfer belt 22 toward the photosensitive drum 31 with a predetermined load and is brought into contact with the intermediate transfer belt 22, thereby forming a primary transfer nip N1. The secondary transfer section 23 is urged by a predetermined load toward the counter roller r2 disposed on the inner peripheral surface of the intermediate transfer belt 22 and comes into contact with the counter roller through the intermediate transfer belt 22 to form a secondary transfer nip N2.

The toner images formed on the photosensitive drums 31 of the image forming units 30 of the respective colors in the image forming section 20 are transferred onto the intermediate transfer belt 22 by the primary transfer sections 21 and sequentially superimposed thereon to form a full-color toner image of four colors or five colors including the four colors and a spot color. The full-color toner image is transferred onto the continuous paper 91 by the secondary transfer section 23. The transferred toner image is heated and pressurized by the fixing section 24 on a downstream side to be fixed on the continuous paper 91. The residual toner on the intermediate transfer belt 22 is removed by a cleaning section (not shown) disposed to face the roller r3.

(First Crimping/Release Mechanism 15)

Each of the first crimping/release mechanisms 15*a* and 15*b* (hereinafter, also collectively referred to as first crimping/release mechanisms 15) includes a drive source such as a drive motor, a cam, an arm, and the like. The first crimping/release mechanism 15 moves the primary transfer section 21 in the radial direction of the intermediate transfer belt 22 to switch between a crimping position and a release position (hereinafter, referred to as switching between crimping and release). The first crimping/release mechanism 15*a* switches between crimping and release of the three primary transfer sections 21Y, 21M, and 21C together. The first crimping/release mechanism 15*b* individually performs switching between crimping and release of the primary transfer section 21S. Note that this is not exhaustive, and the first crimping/release mechanism 15 may be configured to be able to switch between crimping and release of at least one of the plurality of primary transfer sections 21Y, 21M, 21C, 21K, and 21S. Further, the first crimping/release mechanism 15 may be configured to be able to individually switch between crimping/release of the primary transfer sections 21Y, 21M, and 21C as the primary transfer sections 21. Furthermore, switching between crimping and release of the primary transfer section 21K for the K color may be performed. By doing so, the image forming apparatus 1 can execute multi-color (for example, a combination of any two to four of Y, M, C, K, and S) other than the three types of print modes shown in FIGS. 3A to 3C.

At the "crimping position", as illustrated in FIG. 3A, the primary transfer section 21Y (roller r6) is urged by a predetermined load to abut against the photosensitive drum 31Y through the intermediate transfer belt 22, thereby forming a primary transfer nip N1. At the "release position", as illustrated in FIG. 3C, the primary transfer section 21Y is retracted inward, thereby separating the intermediate transfer belt 22 and the photosensitive drum 31Y from each other. At the release position, the primary transfer section 21Y (roller r6) moves inward to come into non-contact with the intermediate transfer belt 22 (the state in FIG. 3C) or come into slight contact with the intermediate transfer belt 22 (not illustrated), and the stretched state of the intermediate transfer belt 22 at the rollers r1 to r10 changes. In the five-color mode in FIG. 3A, all of the five primary transfer sections 21Y, 21M, 21C, 21K, and 21S are located at the crimping positions, and the intermediate transfer belt 22 is stretched by the ten rollers r1 to r10.

When the print mode is switched from the five-color mode illustrated in FIG. 3A to the four-color mode illustrated in FIG. 3B, the primary transfer section 21S is switched by the first crimping/release mechanism 15*b* from the crimping position to the release position (indicated by the arrows in FIG. 3B). In this case, the intermediate transfer belt 22 is not in contact with the photosensitive drum 31S and the primary transfer section 21S, and the intermediate transfer belt 22 is stretched by the nine rollers r1 to r9. The looseness of the intermediate transfer belt 22 due to a change in the stretched state (change in the path) of the intermediate transfer belt 22 caused by the movement of the primary transfer section 21S is alleviated by the upward (outward) movement of the tension roller r4 (indicated by the arrow in FIG. 3B). Similarly, when the mode is switched to the special color mode illustrated in FIGS. 3A to 3C, the primary transfer sections 21Y, 21M, and 21C are switched from the crimping position to the release position by the first crimping/release mechanism 15*a*. Referring to FIG. 3C, the intermediate transfer belt 22 is stretched around the seven rollers r1 to r5, r9, and r10. In the present application, the inventor has found that when a color to be used is changed with a change in print mode and the combination of the primary transfer sections 21 changes, the color misregistration amount changes. Therefore, appropriate color misregistration adjustment can be performed by performing color misregistration correction as described below.

(Second Crimping/Release Mechanism 16)

The second crimping/release mechanism 16 includes a drive source such as a drive motor, a cam, an arm, and the like and performs switching between crimping and release of the secondary transfer section 23. As illustrated in FIG. 3A, at the crimping position, the secondary transfer section 23 is urged by a predetermined load toward the counter roller r2 and comes into contact with the counter roller r2 through the continuous paper 91 and the intermediate transfer belt 22, thereby forming a secondary transfer nip N2. At a release position (not illustrated), the secondary transfer section 23 is retracted downward, and the secondary transfer section 23 is not in contact with the intermediate transfer belt 22. At this time, the continuous paper 91 moves downward by its own weight and does not come into contact with the intermediate transfer belt 22.

(Registration Sensor 17)

Figure 5:
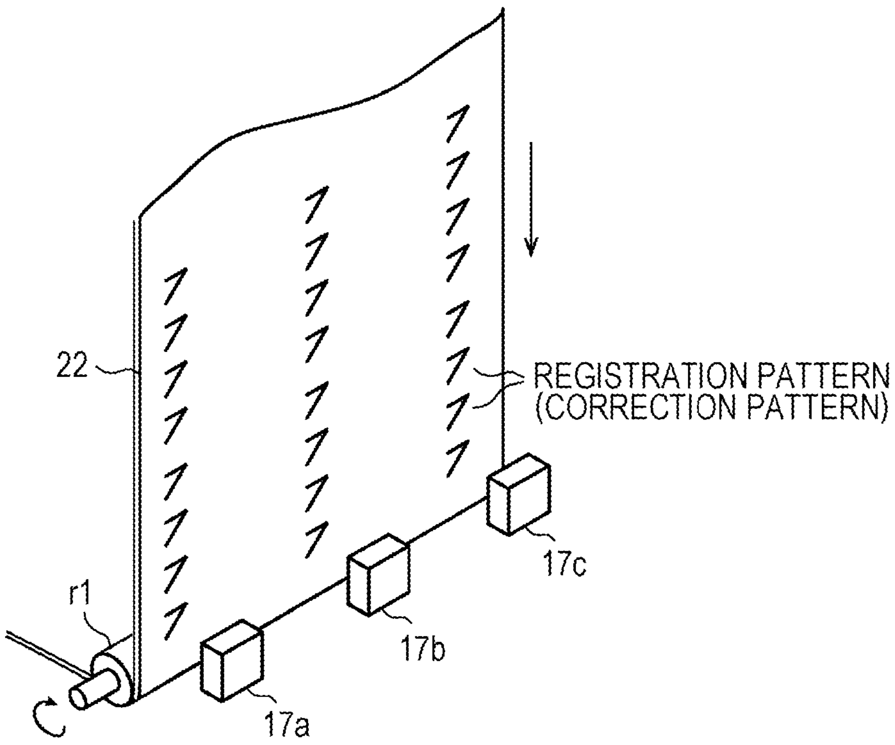
FIG. 5 is a perspective view for explaining registration sensors and a registration pattern.

FIG. 5 is a perspective view for explaining registration sensors 17 and a registration pattern. Registration sensors 17*a*, 17*b*, and 17*c* (which will be hereinafter collectively referred to as the registration sensors 17) are, for example, reflection-type optical sensors each including a light emitting element, such as a light emitting diode, and a light receiving element, such as a photodiode. The registration sensors 17 are disposed at three positions facing the roller r1, that is, at both ends and the center in the axial direction (main scanning direction). In addition, in a case where a special color toner using a transparent toner is used, the registration sensor 17 may select a wavelength having detection sensitivity to the transparent toner.

The registration sensor 17 detects a registration pattern for color misregistration correction (also referred to as color registration) of each color formed on the outer peripheral surface of the intermediate transfer belt 22 in order to obtain a color misregistration correction amount for correcting color misregistration of each color on a sheet when performing color misregistration correction. The registration pattern is composed of a straight line along the main scanning direction and an oblique straight line intersecting with the straight line (V-shape or fold-back shape). By detecting a position in the main scanning direction from the detection result or the detection interval of the positional relationship between the two straight lines of the registration pattern using the registration sensor 7, the controller 11 can detect a positional deviation amount in the sub-scanning direction orthogonal to the main scanning direction from the detection timing of the straight line along the main scanning direction. This positional shift amount is a positional shift amount with respect to a reference color (K color in most cases), which is one of colors to be used. Based on the positional deviation amount, color misregistration correction amounts for the main scanning and sub-scanning positions of each color (other than the reference color) as illustrated in FIG. 4 described above are determined. Furthermore, a main scanning magnification, a sub-scanning magnification, an inclination, and a curvature are obtained from a combination of the results obtained by the three registration sensors 17*a*, 17*b*, and 17*c* arranged in the main scanning direction or detection timings of the respective registration sensors. The number of registration sensors 17 is only required to be able to detect a registration pattern over the entire width of the intermediate transfer belt 22 so as to be able to detect the positional deviation of the curvature component of the intermediate transfer belt 22, and four or more registration sensors may be arranged. In addition, one line sensor in which a plurality of imaging elements are arranged in a line may be used.

(Environment Sensor 18)

The environment sensor 18 detects a temperature and humidity in the image forming apparatus body 10. In particular, the environment sensor 18 is placed near the intermediate transfer belt 22 and measures the temperature of the intermediate transfer belt 22.

(Communication Section 19)

The communication section 19 is an interface for communicating with other devices such as the supply device 50 and the winding device 60. The communication section 19 is also an interface for network connection with an external device such as a PC.

(Color Misregistration Correction Processing in First Embodiment)

Figure 6:
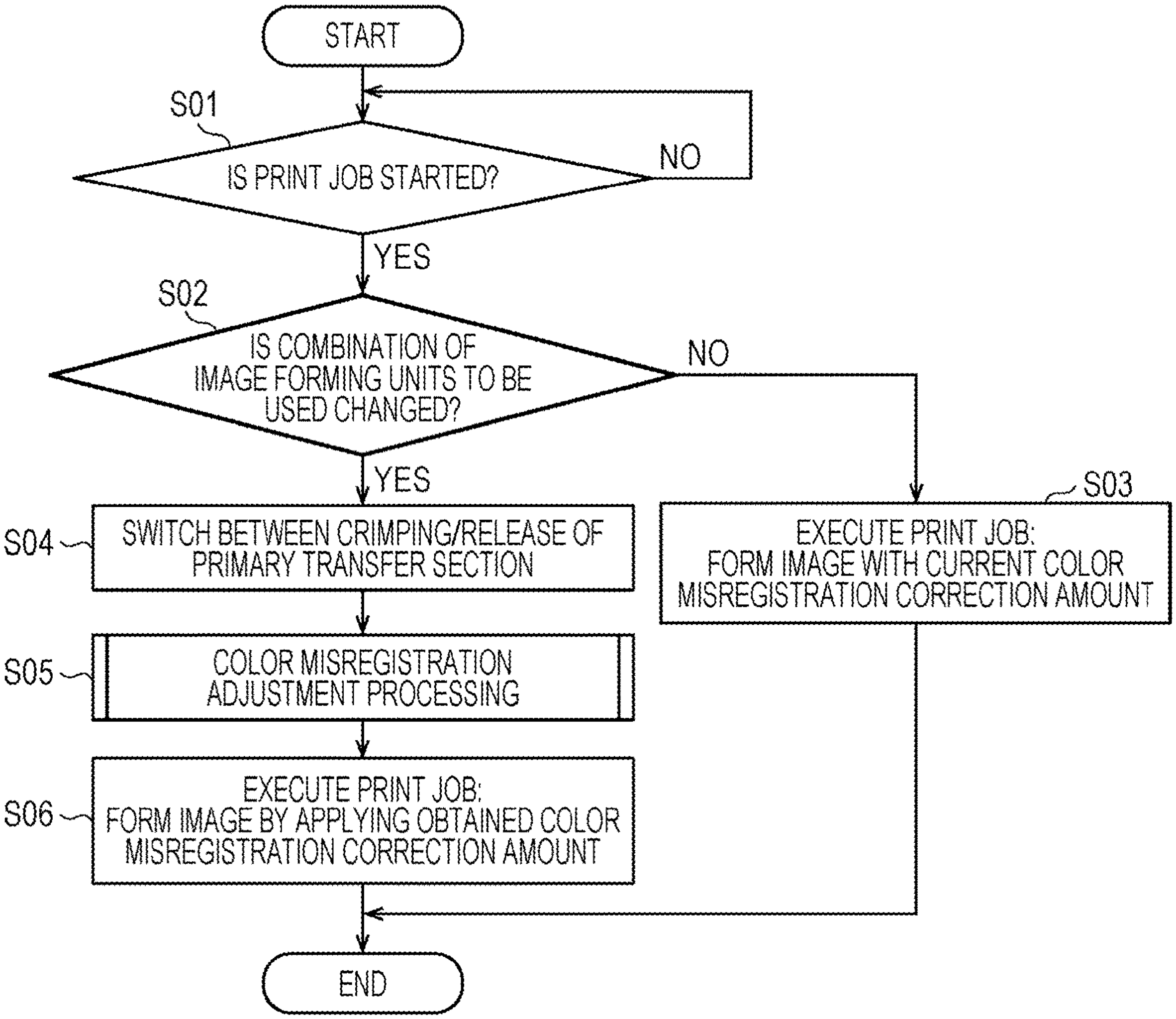
FIG. 6 is a flowchart showing color misregistration correction processing according to the first embodiment executed by the image forming apparatus.

FIG. 6 is a flowchart showing color misregistration correction processing according to the second embodiment executed by the image forming apparatus 1.

(Step S01)

Upon receiving a print job from the user via the operation display section 13 or the PC, the image forming apparatus 1 starts the print job. The data of the print job includes print data and a job ticket. The job ticket describes the print mode to be executed.

(Step S02)

The controller 11 compares the print mode of the print job to be executed with the print job of the print job executed previously and determines whether the combination of the image forming units 30 to be used has been changed. More specifically, it is determined whether switching between crimping and release of any of the primary transfer sections 21 needs to be performed. When the print mode is switched among (1) the five-color mode, (2) the four-color mode, and (3) the special color mode, any one of the primary transfer sections 21 is switched from the crimping position to the release position, or conversely, switched from the release position to the crimping position. If switching between crimping and release of any of the primary transfer sections 21 is to be performed (step S02: YES), the process proceeds to step S04. In contrast to this, if there is no change in the image forming unit 30 to be used and switching is not to be performed (step S02: NO), the process proceeds to step S03. The types of print modes are not limited to the three types (1) to (3) and may include other combinations. For example, a combination of any two colors, three colors, or four colors (for example, Y and K) among Y, M, C, K, and S may be included.

(Step S03)

In this case, the image processing section 112 of the controller 11 performs image processing using the color misregistration correction amount in the current print job, and the image forming section 20 forms an image on the continuous paper 91 based on the image data after the image processing. The processing is then terminated (END).

(Step S04)

The controller 11 controls the first crimping/release mechanism 15 to perform switching between crimping and release of one or more primary transfer sections 21. Assume that the previous mode is the four-color mode illustrated in FIG. 3B and is to be changed to the spot color mode illustrated in FIG. 3C. In this case, the primary transfer sections 21Y, 21M, and 21C are switched from the crimping positions to the release positions by the first crimping/release mechanism 15*a*, and conversely, the primary transfer section 21S is switched from the release position to the crimping position by the first crimping/release mechanism 15*b*.

(Step S05)

Figure 7:
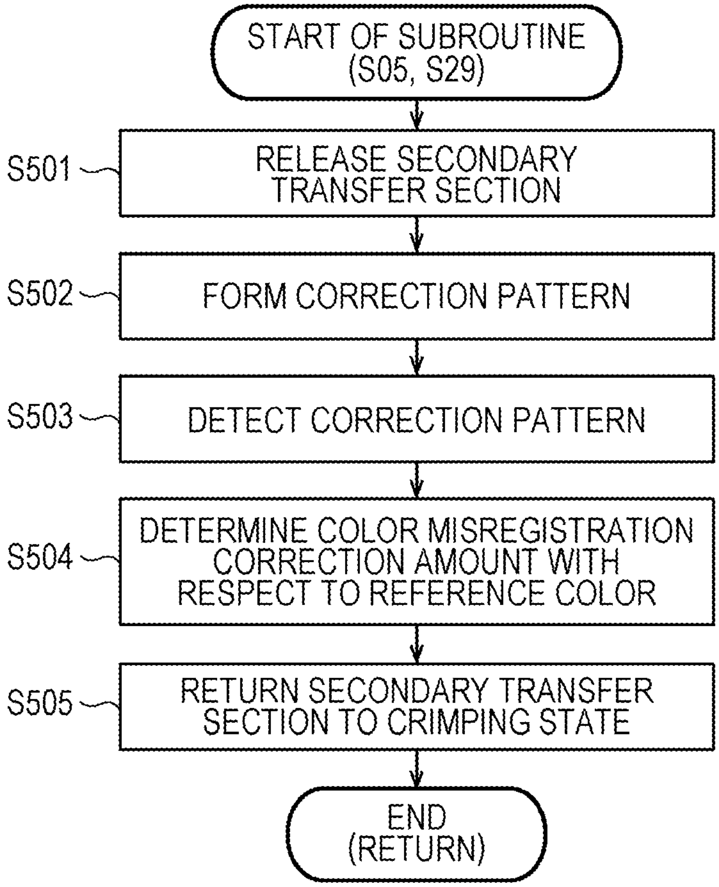
FIG. 7 is a subroutine flowchart illustrating color misregistration adjustment in step S05.

In this case, the color misregistration adjustment section 111 performs the color misregistration adjustment. FIG. 7 is a subroutine flowchart illustrating the color misregistration adjustment processing in step S05.

(Step S501)

The controller 11 moves the secondary transfer section 23 to the release position by the second crimping/release mechanism 16 and separates the secondary transfer section 23 from the counter roller r2. At this time, if the continuous paper 91 is being conveyed, the controller may stop the conveyance, turn off the heater of the fixing section 24, and set the fixing rollers in the separated state.

(Steps S502 to S504)

The color misregistration adjustment section 111 forms a registration pattern of each color on the intermediate transfer belt 22 using the image forming unit 30 to be used and detects the registration pattern using the registration sensor 17. Furthermore, the color misregistration adjustment section 111 calculates the positions (detection timings) of the registration pattern in the main scanning direction and the sub-scanning direction from the detection signal obtained by each registration sensor 17 and determines various color misregistration correction amounts as illustrated in FIG. 4.

(Step S505)

The controller 11 causes the second crimping/release mechanism 16 to move the secondary transfer section 23 to the crimping position so as to return the secondary transfer section 23 to the crimping state in which the transfer nip N2 is formed. Thus, the processing in FIG. 7 is terminated, and the process returns to step S06 and subsequent steps in FIG. 6.

(Step S06)

In this case, the image processing section 112 of the controller 11 performs image processing using the color misregistration correction amount obtained in step S05. In addition, the image forming section 20 performs image formation on the continuous paper 91 using the image data after the image processing, and the processing is terminated (END).

As described above, the controller of the image forming apparatus according to the present embodiment performs color misregistration adjustment by the pattern for color misregistration correction upon changing of the combination of a crimping/release mechanism that moves at least one of the primary transfer sections in accordance with a combination of the image forming units used for image formation to switch between a crimping position where the transfer nip is formed and a release position where the intermediate transfer belt and the image carrier are separated from each other and the image forming units used for image formation. Accordingly, appropriate color misregistration adjustment can be performed even in a case where a plurality of types of print modes having different numbers of colors or combinations of colors are executed.

(Color Misregistration Correction Processing in Second Embodiment)

Figure 8:
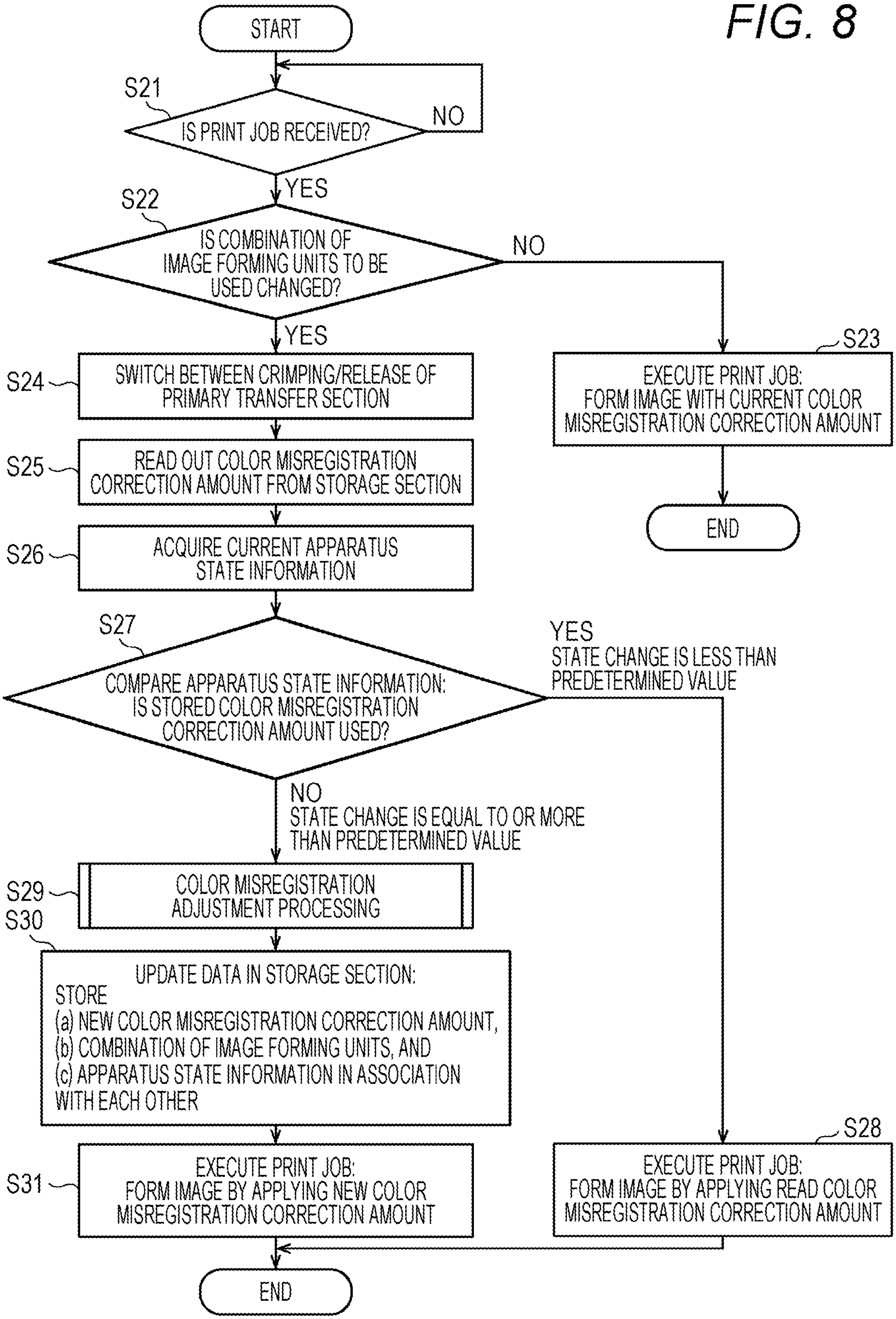
FIG. 8 is a flowchart showing color misregistration correction processing according to the second embodiment executed by an image forming apparatus.

A color misregistration correction process according to the second embodiment will be described next with reference to FIGS. 8 and 9. FIG. 8 is a flowchart illustrating color misregistration correction processing according to the second embodiment which is executed by the image forming apparatus 1, and FIG. 9 is an example of a color misregistration correction amount stored in the storage section 12. As illustrated in FIG. 9, in the second embodiment, the state information of the image forming apparatus 1 at the time of color misregistration adjustment when the color misregistration correction amount is determined is stored in association with the color misregistration correction amount stored for each print mode. As illustrated in FIG. 9, the items of the apparatus state information include total number of prints and environmental temperature. The total number of prints is information on the current total number of prints which is sequentially updated and stored in the storage section 12. Instead of total number of prints, any of the following indices may be used: use time, drive time, and number of print images of the image forming apparatus 1. Environmental temperature is the internal temperature of the apparatus at the time of the previous color misregistration adjustment which is detected by the environment sensor 18. Note that the apparatus state information may include at least one of these two items. In the second embodiment, as described below, in a case where the change in the apparatus state is less than a predetermined amount, the color misregistration correction amount at the time of the previous color misregistration adjustment is applied as it is, and new color misregistration adjustment is omitted.

(Steps S21 to S24)

The processing here is the same as the processing in steps S01 to S04 illustrated in FIG. 6, and a description thereof will be omitted.

(Step S25)

A controller 11 reads out the color misregistration correction amount of a print mode having the same number and types of colors to be used from the storage section 12. For example, when the print mode is changed from another print mode to the five-color mode, the color misregistration correction amount of the five-color mode corresponding thereto is read out. As shown in FIG. 9, the color misregistration correction amount is associated with the apparatus state information at the time of color misregistration adjustment when the color misregistration correction amount is determined (by update processing in step S30 described later).

(Step S26)

The controller 11 acquires the current apparatus state information. For example, the controller 11 acquires temperature information from an environment sensor 18 or reads the total number of prints from the storage section 12.

(Step S27)

The controller 11 compares the apparatus state information of the color misregistration correction amount read in step S25 with the current apparatus state information acquired in step S26. If the change in the state of the apparatus state information is less than a predetermined amount (YES), the process proceeds to step S28. On the other hand, if the state change is equal to or greater than a predetermined value (NO), the process proceeds to step S29. For example, when the difference between the environment temperatures is less than 3° C., or when the difference in the total number of prints is less than 1500 prints, the process proceeds to step S28. Note that either one of these two items may be used as an apparatus state, or these may be combined, and if the difference between both items is less than a predetermined value, YES may be determined, and the process may proceed to step S28.

(Step S28)

In this case, the image forming apparatus 1 executes a print job by applying the color misregistration correction amount read out in step S25 and stored in the storage section 12 without performing new color misregistration adjustment by a color misregistration adjustment section 111. More specifically, the image processing section 112 of the controller 11 performs image processing using the color misregistration correction amount in the previous print job read out in step S25, and the image forming section 20 forms an image on the continuous paper 91 using the image data after the image processing. The processing is then terminated (END).

(Step S29)

In this case, the color misregistration adjustment section 111 performs the color misregistration adjustment. The processing is the same as that in step S05 (the subroutine flowchart in FIG. 7), and a description thereof will be omitted.

(Step S30)

The controller 11 updates the data in the storage section 12 with the color misregistration correction amount determined by the color misregistration adjustment in step S29 (hereinafter referred to as a new color misregistration correction amount). At the time of this update, the storage section 12 stores the combination information of the colors of the image forming units 30 and the apparatus state information at the present time acquired in step S26 in association with each other.

(Step S31)

In this case, the image forming apparatus 1 executes a print job by applying the new color misregistration correction amount obtained in step S29. More specifically, the image processing section 112 of the controller 11 performs image processing using the new color misregistration correction amount, and the image forming section 20 forms an image on the continuous paper 91 using the image data after the image processing. The processing is then terminated (END).

As described above, the second embodiment can have the same effect as that of the first embodiment. In addition, the second embodiment compares the apparatus state information associated with the color misregistration correction amount corresponding to the combination of the image forming units to be used with the current apparatus state information of the image forming apparatus, performs color misregistration correction using the color misregistration correction amount newly obtained by performing color misregistration adjustment if the change is equal to or larger than a predetermined value, and performs color misregistration correction using the previous (past) color misregistration correction amount stored in the storage section without performing color misregistration adjustment if the change is less than the predetermined value. By so doing, when the previous color misregistration correction amount can be used, color misregistration adjustment can be omitted, and a decrease in productivity can be suppressed.

The above-described configuration of the image forming apparatus has been described as a main configuration for describing the features of the above-described embodiment and is not limited to the above-described configuration, and various modifications can be made within the scope of the claims. Further, the configuration of a general image forming apparatus is not excluded.

MODIFICATION EXAMPLE

For example, the above embodiment has exemplified the image forming apparatus 1 using continuous paper. However, the image forming apparatus 1 may use cut sheets. Furthermore, although color misregistration adjustment is performed by releasing the crimping of the secondary transfer section 23 when continuous paper is used, since the secondary transfer section 23 is in a crimping state when a print job is executed, the state during color misregistration adjustment differs from the state during printing. Color misregistration sometimes affects between different crimping states of the secondary transfer section 23. In such a case, the controller 11 of the image forming apparatus 1 may grasp the amount of change or the rate of change in color misregistration in the state of crimping/release of the secondary transfer section 23 in advance, store it in the storage section 12, and use it to perform prospective correction. For example, the controller 11 applies, as a color misregistration correction amount after correction, the value obtained by adding a shift value corresponding to the color misregistration change amount or change rate to the color misregistration amount calculated and obtained from detection by the registration sensor 17 through the processing in FIGS. 6 and 7 or by multiplying the obtained color misregistration amount by a correction coefficient.

Furthermore, the means and method for performing various kinds of processing in the image forming apparatus according to the above-described embodiment can be implemented by either a dedicated hardware circuit or a programmed computer. The program may be provided by a computer readable recording medium such as a USB memory or a digital versatile disc (DVD)-ROM or may be provided online via a network such as the Internet. In this case, the program recorded on the computer readable recording media is usually transferred to a storage section such as a hard disk and stored therein. Furthermore, the program may be provided as a single piece of application software or may be incorporated as a function of the apparatus into software of the apparatus.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image forming apparatus comprising:

a plurality of image forming units that include image carriers and form toner images of different colors on the image carriers by using developing devices;

an intermediate transfer belt to which the toner image on the image carrier is transferred;

a plurality of primary transfer sections that are each provided facing a corresponding one of the plurality of image carriers and form a transfer nip by being urged toward the image carrier from an inner peripheral surface side of the intermediate transfer belt;

a crimping/release mechanism that switches between a crimping position where the transfer nip is formed and a release position where the intermediate transfer belt and the image carrier are separated from each other by moving at least one of the primary transfer sections according to a combination of the image forming units used for image formation;

a storage section containing a previous image forming apparatus state information; and a hardware processor that performs color misregistration adjustment when the combination of the image forming units used for image formation is changed and when a difference between a current image forming apparatus state information and the previous image forming apparatus state information exceeds a predetermined value.

2. The image forming apparatus according to claim 1, further comprising a sensor that detects a pattern for color misregistration correction formed of the toner images transferred onto the intermediate transfer belt, wherein the processor performs the color misregistration adjustment by detecting the pattern for color misregistration correction.

3. The image forming apparatus according to claim 2, wherein in the color misregistration adjustment, the processor detects, with the sensor, positions of the patterns formed by a plurality of image forming units and, in a case where one of toners of a plurality of colors is set as a reference color, determines a color misregistration correction amount in image formation based on image formation positions of toners of other colors with respect to an image formation position of a toner of the reference color.

4. The image forming apparatus according to claim 3, wherein the processor corrects an image formation position in at least one of the plurality of image forming units based on the color misregistration correction amount.

5. The image forming apparatus according to claim 4, further comprising a storage section that stores the color misregistration correction amount determined by the color misregistration adjustment for each combination of the image forming units, among the plurality of image forming units, in which the primary transfer sections are set at the crimping positions and which are used for image formation.

6. The image forming apparatus according to claim 5, wherein the processor performs color misregistration correction using the color misregistration correction amount stored in the storage section for each combination of the image forming units to be used.

7. The image forming apparatus according to claim 1, wherein the image forming apparatus forms an image on continuous paper and further comprises a secondary transfer section that transfers the toner image on the intermediate transfer belt to the continuous paper.

8. The image forming apparatus according to claim 7, wherein during the color misregistration adjustment, crimping of the secondary transfer section with respect to the intermediate transfer belt is released.

9. The image forming apparatus according to claim 1, wherein the plurality of image forming units include four image forming units that form toner images of Y, M, C, and K colors, the combination of the plurality of image forming units includes a first group composed of the four image forming units that respectively form toner images of Y, M, C, and K colors and a second group composed of a combination of colors different from the colors of the first group, and the processor executes the color misregistration adjustment in a case where a change is made from the first group to the second group or vice versa according to a setting in a print job.

10. The image forming apparatus according to claim 9, wherein the plurality of image forming units further include an image forming unit that forms a toner image of a special color other than Y, M, C, and K colors, and the second group includes a combination of five image forming units that form toner images of Y, M, C, and K colors and a special color.

11. An image forming apparatus comprising:

a plurality of image forming units that include image carriers and form toner images of different colors on the image carriers by using developing devices;

an intermediate transfer belt to which the toner image on the image carrier is transferred;

a plurality of primary transfer sections that are each provided facing a corresponding one of the plurality of image carriers and form a transfer nip by being urged toward the image carrier from an inner peripheral surface side of the intermediate transfer belt;

a crimping/release mechanism that switches between a crimping position where the transfer nip is formed and a release position where the intermediate transfer belt and the image carrier are separated from each other by moving at least one of the primary transfer sections according to a combination of the image forming units used for image formation;

a hardware processor that performs color misregistration adjustment when the combination of the image forming units used for image formation is changed; and a sensor that detects a pattern for color misregistration correction formed of the toner images transferred onto the intermediate transfer belt;

wherein the processor performs the color misregistration adjustment by detecting the pattern for color misregistration correction;

wherein in the color misregistration adjustment, the processor detects, with the sensor, positions of the patterns formed by a plurality of image forming units and, in a case where one of toners of a plurality of colors is set as a reference color, determines a color misregistration correction amount in image formation based on image formation positions of toners of other colors with respect to an image formation position of a toner of the reference color;

wherein the processor corrects an image formation position in at least one of the plurality of image forming units based on the color misregistration correction amount;

the image forming apparatus further comprising a storage section that stores the color misregistration correction amount determined by the color misregistration adjustment for each combination of the image forming units, among the plurality of image forming units, in which the primary transfer sections are set at the crimping positions and which are used for image formation;

wherein the storage section stores, together with the color misregistration correction amount, apparatus state information of the image forming apparatus at the time of color misregistration adjustment in association with the color misregistration correction amount, and wherein the processor compares, when one of the primary transfer sections is switched from the crimping position to the release position or vice versa by the crimping/release mechanism, the apparatus state information associated with the color misregistration correction amount matching the combination of the image forming units to be used with the current apparatus state information on the image forming apparatus, performs the color misregistration correction using a color misregistration correction amount newly obtained by performing the color misregistration adjustment when a change is not less than a predetermined amount, and performs the color misregistration correction using the color misregistration correction amount stored in the storage section without performing the color misregistration adjustment when the change is less than the predetermined amount.

12. An image forming apparatus comprising:

a plurality of image forming units that include image carriers and form toner images of different colors on the image carriers by using developing devices;

an intermediate transfer belt to which the toner image on the image carrier is transferred;

a plurality of primary transfer sections that are each provided facing a corresponding one of the plurality of image carriers and form a transfer nip by being urged toward the image carrier from an inner peripheral surface side of the intermediate transfer belt;

a crimping/release mechanism that switches between a crimping position where the transfer nip is formed and a release position where the intermediate transfer belt and the image carrier are separated from each other by moving at least one of the primary transfer sections according to a combination of the image forming units used for image formation; and a hardware processor that performs color misregistration adjustment when the combination of the image forming units used for image formation is changed;

wherein the image forming apparatus forms an image on continuous paper and further comprises a secondary transfer section that transfers the toner image on the intermediate transfer belt to the continuous paper;

wherein during the color misregistration adjustment, crimping of the secondary transfer section with respect to the intermediate transfer belt is released;

wherein the processor stores a shift value or a correction coefficient of a color misregistration correction amount set in advance when the secondary transfer section is in a crimping state and a release state, and wherein the color misregistration correction amount is set to a value obtained by adding the shift value to the color misregistration amount obtained from detection of the sensor or a value obtained by multiplying the color misregistration amount by the correction coefficient.

13. A color misregistration correction method executed in an image forming apparatus including a plurality of image forming units that include image carriers and form toner images of different colors on the image carriers by using developing devices, an intermediate transfer belt to which the toner image on the image carrier is transferred, a plurality of primary transfer sections that are each provided facing a corresponding one of the plurality of image carriers and form a transfer nip by being urged toward the image carrier from an inner peripheral surface side of the intermediate transfer belt, a crimping/release mechanism that switches between a crimping position where the transfer nip is formed and a release position where the intermediate transfer belt and the image carrier are separated from each other by moving at least one of the primary transfer sections according to a combination of the image forming units used for image formation, and a storage section containing a previous image forming apparatus state information; and the color misregistration correction method comprising performing color misregistration adjustment when the combination of the image forming units used for image formation is changed and when a difference between a current image forming apparatus state information and the previous image forming apparatus state information exceeds a predetermined value.

14. A computer readable recording medium storing a control program for controlling an image forming apparatus including a plurality of image forming units that include image carriers and form toner images of different colors on the image carriers by using developing devices, an intermediate transfer belt to which the toner image on the image carrier is transferred, a plurality of primary transfer sections that are each provided facing a corresponding one of the plurality of image carriers and form a transfer nip by being urged toward the image carrier from an inner peripheral surface side of the intermediate transfer belt, a crimping/release mechanism that switches between a crimping position where the transfer nip is formed and a release position where the intermediate transfer belt and the image carrier are separated from each other by moving at least one of the primary transfer sections according to a combination of the image forming units used for image formation, and a storage section containing a previous image forming apparatus state information; and the control program causing a computer to perform color misregistration adjustment when the combination of the image forming units used for image formation is changed and when a difference between a current image forming apparatus state information and the previous image forming apparatus state information exceeds a predetermined value.

* * * * *